LUTHER E. BURDIN.
Improvement in Plows.

No. 121,153. Patented Nov. 21, 1871.

Witnesses:
Jas. E. Hutchinson
C. L. Evert

Inventor
Luther E. Burdin
per Alexander Mason
Attys.

UNITED STATES PATENT OFFICE.

LUTHER E. BURDIN, OF LEXINGTON, KENTUCKY.

IMPROVEMENT IN PLOWS.

Specification forming part of Letters Patent No. 121,153, dated November 21, 1871.

*To all whom it may concern:*

Be it known that I, LUTHER E. BURDIN, of Lexington, in the county of Fayette and in the State of Kentucky, have invented a certain new and useful Improvement in Plows; and do hereby declare that the following is a full, clear, and exact description thereof, reference being had to the accompanying drawing and to the letters of reference marked thereon making a part of this specification.

The nature of my invention consists in the construction and arrangement of a plow, as will be hereinafter more fully set forth.

In order to enable others skilled in the art to which my invention appertains to make and use the same, I will now proceed to describe its construction and operation, referring to the annexed drawing, in which—

Figure 1:
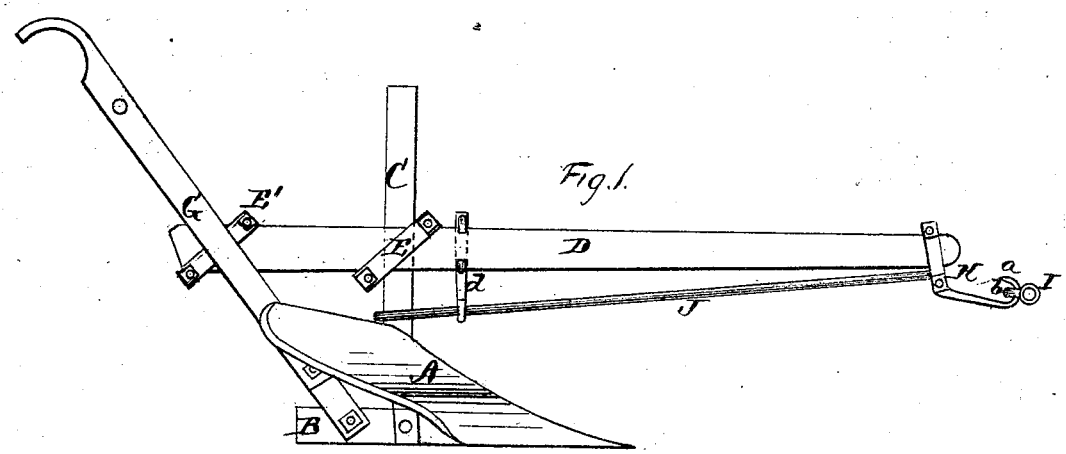
Figure 2:
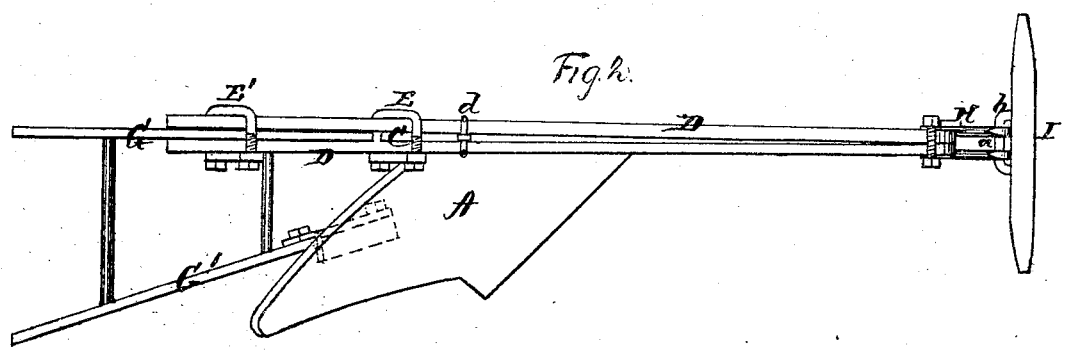

Figure 1 is a side view, and Fig. 2 a plan view of my plow.

A represents the mold-board, and B the land-side of an ordinary plow, both of which are attached to an upright standard, C. This standard passes up between two beams, D D, and clamped between them by a clamp, E, as shown. Another clamp, E', fastens the two beams at their rear ends, and clamps one of the handles G between them at this point. This handle is attached to the land-side B, while the other handle is attached to the mold-board A, as shown. The front ends of the beams D D are clamped together by a double bearing-clevis, H, having two hooks, $a$ $a$, upon which is placed a long staple, $b$, in the double or single-tree I. The clevis, having two bearings, prevents the plow from running out of the ground while in motion. The front ends of the double beam may be otherwise attached together by any suitable means. J is a draft-rod hooked to the clevis H, and passing under the double plow-beam through a guide, $d$, suspended from said beam, and its rear end attached to the standard C in any suitable or convenient manner.

The advantages of this plow-stock are its cheapness and durability, costing less than one-half of the ordinary plow-stock, and less liable to break or give way. It can be adjusted to run any depth without changing the run of the plow by merely releasing the clamps E E'. The handles G G' may be held by the clamp E', one upon each side of the double beam, and their lower ends fastened to the standard by a similar clamp, whereby they may be adjusted to suit the height of the plowman.

Having thus fully described my invention, what I claim as new, and desire to secure by Letters Patent, is—

1. The combination of the double beam D D, suitably connected at its forward ends, clamps E E', handles G G', standard C, mold-board A, and land-side B, all constructed substantially as set forth.

2. The combination of the double beam D D with guide $d$, draft-rod J, standard C, clevis H, and pivoted hooks $a$ $a$, all substantially as set forth.

In testimony that I claim the foregoing I have hereunto set my hand this 11th day of August, 1871.

LUTHER E. BURDIN.

Witnesses:
A. N. MARR,
C. L. EVERT.

(114)